United States Patent
Xue et al.

(10) Patent No.: US 12,552,957 B2
(45) Date of Patent: Feb. 17, 2026

(54) INDUSTRIAL THERMAL INKJET INKS

(71) Applicant: Videojet Technologies Inc., Wood Dale, IL (US)

(72) Inventors: Zheng Xue, Burr Ridge, IL (US); Stormi Tindall, Joliet, IL (US); Vanessa Demarco, Chicago, IL (US); Michael Kozee, Wheaton, IL (US); Linfang Zhu, Woodridge, IL (US)

(73) Assignee: Videojet Technologies Inc., Wood Dale, IL (US)

( * ) Notice: Subject to any disclaimer, the term of this patent is extended or adjusted under 35 U.S.C. 154(b) by 1087 days.

(21) Appl. No.: 17/607,160

(22) PCT Filed: Apr. 30, 2020

(86) PCT No.: PCT/US2020/030809
§ 371 (c)(1),
(2) Date: Oct. 28, 2021

(87) PCT Pub. No.: WO2020/223533
PCT Pub. Date: Nov. 5, 2020

(65) Prior Publication Data
US 2022/0315795 A1    Oct. 6, 2022

Related U.S. Application Data

(60) Provisional application No. 62/840,807, filed on Apr. 30, 2019.

(51) Int. Cl.
*C09D 171/10*   (2006.01)
*C09D 11/328*   (2014.01)
(Continued)

(52) U.S. Cl.
CPC .......... *C09D 171/10* (2013.01); *C09D 11/328* (2013.01); *C09D 11/36* (2013.01); *C09D 175/04* (2013.01)

(58) Field of Classification Search
CPC .... C09D 171/10; C09D 11/328; C09D 11/36; C09D 175/04; C09D 11/103;
(Continued)

(56) References Cited

U.S. PATENT DOCUMENTS 5,060,021 A * 10/1991 Yamamoto ......... G03G 15/0812
                                                        399/281
5,654,121 A *  8/1997 Eichhorn ................ G03F 7/039
                                                        430/326
(Continued)

FOREIGN PATENT DOCUMENTS

CN            1385478 A    12/2002
CN          102986068 A     3/2013
(Continued)

OTHER PUBLICATIONS

English machine translation of JP-4975991-B2 (Year: 2012).*
(Continued)

*Primary Examiner* — Amber R Orlando
*Assistant Examiner* — Jeffrey Eugene Barzach
(74) *Attorney, Agent, or Firm* — Foley & Lardner LLP

(57) ABSTRACT

The present invention is a thermal inkjet ink that provides good reliability at a wide range of industrial print conditions from both low temperature to high temperature environments across a broad range of humidities. It is particularly advantageous in low-temperature applications, for example, printing at temperatures down to 5° C. or lower continuously for 8 hours without developing print defects which can lead to unreadable codes; and, in the meantime also maintains other critical functional aspects including contrast, wetting, decap time, dry time, adhesion, ink cartridge stability, etc. The inks contain one or more binder resins that exhibit a hydroxyl number or acid number of at least 100 mg KOH/g; one or more terpene phenolic resins; one or more volatile (Continued)

organic solvents; and one or more dyes, and optionally further components.

26 Claims, 7 Drawing Sheets

(51) Int. Cl.
*C09D 11/36* (2014.01)
*C09D 175/04* (2006.01)

(58) Field of Classification Search
CPC ... C09D 11/106; C09D 11/107; C09D 11/102; C09D 11/30; B41M 5/00; B41M 5/0023; B41M 5/0047
See application file for complete search history.

(56) References Cited

U.S. PATENT DOCUMENTS

| | | | |
|---|---|---|---|
| 6,444,019 B1 | 9/2002 | Zou et al. | |
| 6,797,745 B1 | 9/2004 | Malhotra | |
| 2003/0165764 A1* | 9/2003 | Suwa | G03G 9/08755 430/108.4 |
| 2008/0276833 A1* | 11/2008 | Sasaki | C09D 11/30 106/31.13 |
| 2010/0233368 A1* | 9/2010 | Zhu | C09D 11/36 427/256 |
| 2015/0024133 A1* | 1/2015 | Zhu | C08K 3/22 427/256 |
| 2015/0100248 A1* | 4/2015 | Daulton | G06Q 10/10 702/22 |
| 2016/0362569 A1* | 12/2016 | Mai | C09D 11/102 |
| 2018/0072902 A1* | 3/2018 | Takemoto | C09D 11/103 |
| 2018/0251650 A1* | 9/2018 | Xue | C09D 11/102 |
| 2020/0131389 A1* | 4/2020 | Inoue | B41J 2/01 |
| 2020/0172751 A1* | 6/2020 | Algaier | C09D 11/10 |
| 2020/0339842 A1* | 10/2020 | Watanabe | C09J 107/00 |
| 2022/0041873 A1* | 2/2022 | Matsumoto | B41J 2/01 |

FOREIGN PATENT DOCUMENTS

| | | | | |
|---|---|---|---|---|
| CN | 104583344 A | | 4/2015 | |
| CN | 108291104 A | | 7/2018 | |
| EP | 0259001 A1 | | 3/1988 | |
| EP | 0501406 A1 | | 9/1992 | |
| EP | 3263660 A1 | | 1/2018 | |
| JP | 4975991 B2 | * | 7/2012 | |
| JP | 2015013954 A | * | 1/2015 | |
| WO | WO-2017048499 A1 | * | 3/2017 | ........... C09D 11/102 |
| WO | 2019078854 A1 | | 4/2019 | |

OTHER PUBLICATIONS

English machine translation of JP-2015013954-A (Year: 2015).*
"Joncryl® 682." BASF, https://dispersions-resins-products.basf.us/files/technical-datasheets/Joncryl_682_December_2019_R4_PP.pdf. Accessed Nov. 29, 2024 (Year: 2024).*
PCT/US2020/30809; International Search Report and Written Opinion; Aug. 21, 2020, 11 pages.
Chinese Patent Office Action dated Aug. 19, 2022 in Chinese Application No. 202080048113.2.

* cited by examiner

| | | 100 FPM | 200 FPM |
|---|---|---|---|
| Comparative Example 1 | Print quality |  |  |
| | 2-D barcode grade | B | C |
| Comparative Example 2 | Print quality |  |  |
| | 2-D barcode grade | B | B |
| Comparative Example 3 | Print quality |  |  |
| | 2-D barcode grade | B | F |

| 300x300 dpi | EXAMPLE 3B | Comparative Example 2 | Comparative Example 3 |
|---|---|---|---|
| Aqueous coat card | | | |
| Barcode grade | A | A | A |
| contrast | 73 | 73 | 73 |
| Rmin | 10 | 9 | 10 |
| Modulation | 4 | 4 | 4 |
| Fixed Pattern Damage | 4 | 4 | 4 |
| Varnish card | | | |
| Barcode grade | B | B | B |
| contrast | 68 | 68 | 67 |
| Rmin | 9 | 9 | 10 |
| Modulation | 4 | 4 | 4 |
| Fixed Pattern Damage | 4 | 4 | 4 |
| UV coat card | | | |
| Barcode grade | B | B | B |
| contrast | 67 | 67 | 66 |
| Rmin | 9 | 9 | 10 |
| Modulation | 4 | 4 | 4 |
| Fixed Pattern Damage | 4 | 4 | 4 |
| PVC | | | |
| Barcode grade | B | B | B |
| contrast | 66 | 66 | 64 |
| Rmin | 11 | 11 | 13 |
| Modulation | 4 | 4 | 4 |
| Fixed Pattern Damage | 4 | 4 | 4 |

FIG. 3A

| 300×300 dpi | EXAMPLE 3B | Comparative Example 2 | Comparative Example 3 |
|---|---|---|---|
| LDPE film | | | |
| Barcode grade | B | B | B |
| contrast | 61 | 62 | 60 |
| Rmin | 10 | 10 | 11 |
| Modulation | 4 | 4 | 4 |
| Fixed Pattern Damage | 4 | 4 | 4 |
| PE film | | | |
| Barcode grade | B | B | B |
| contrast | 63 | 61 | 60 |
| Rmin | 10 | 11 | 12 |
| Modulation | 4 | 4 | 4 |
| Fixed Pattern Damage | 4 | 4 | 4 |
| Polyester film | | | |
| Barcode grade | C | C | C |
| contrast | 47 | 46 | 47 |
| Rmin | 9 | 9 | 9 |
| Modulation | 4 | 4 | 4 |
| Fixed Pattern Damage | 4 | 4 | 4 |
| BOPP film | | | |
| Barcode grade | B | B | B |
| contrast | 62 | 61 | 61 |
| Rmin | 11 | 12 | 12 |
| Modulation | 4 | 4 | 4 |
| Fixed Pattern Damage | 4 | 4 | 4 |

FIG. 3B

| 300x300 dpi | EXAMPLE 3B | Comparative Example 2 | Comparative Example 3 |
|---|---|---|---|
| Polystyrene card | | | |
| Barcode grade | B | B | B |
| contrast | 60 | 60 | 60 |
| Rmin | 14 | 14 | 14 |
| Modulation | 4 | 4 | 4 |
| Fixed Pattern Damage | 4 | 4 | 4 |
| PP film | | | |
| Barcode grade | B | B | B |
| contrast | 60 | 59 | 58 |
| Rmin | 9 | 10 | 10 |
| Modulation | 4 | 4 | 4 |
| Fixed Pattern Damage | 4 | 4 | 4 |
| HDPE, hard flat | | | |
| Barcode grade | F | F | F |
| contrast | 36 | 40 | 34 |
| Rmin | 11 | 12 | 13 |
| Modulation | 0 | 0 | 0 |
| Fixed Pattern Damage | 2 | 0 | 1 |
| Coated Aluminum foil | | | |
| Barcode grade | D | D | D |
| contrast | 23 | 23 | 23 |
| Rmin | 8 | 8 | 8 |
| Modulation | 4 | 4 | 4 |
| Fixed Pattern Damage | 4 | 4 | 3 |

| | Initial | Post 2 hours printing | Post 4 hours printing |
|---|---|---|---|
| Comparative Example 1 | (01) 1A2B 5 pt   Print No. 00102<br>(01) 1A2B 6 pt        08:32:11<br>(01) 1A2B 7 pt        05 Dec<br>(01) 1A2B 8 pt        2018 | (01) 1A2B 5 pt   Print No. 05861<br>(01) 1A2B 6 pt        10:32:03<br>(01) 1A2B 7 pt        05 Dec<br>(01) 1A2B 8 pt        2018 | (01) 1A2B 5 pt   Print No. 11948<br>(01) 1A2B 6 pt        12:40:11<br>(01) 1A2B 7 pt        05 Dec<br>(01) 1A2B 8 pt        2018 |
| Comparative Example 2 | (01) 1A2B 5 pt   Print No. 00102<br>(01) 1A2B 6 pt        08:32:11<br>(01) 1A2B 7 pt        05 Dec<br>(01) 1A2B 8 pt        2018 | (01) 1A2B 5 pt   Print No. 05861<br>(01) 1A2B 6 pt        10:32:03<br>(01) 1A2B 7 pt        05 Dec<br>(01) 1A2B 8 pt        2018 | (01) 1A2B 5 pt   Print No. 11948<br>(01) 1A2B 6 pt        12:40:11<br>(01) 1A2B 7 pt        05 Dec<br>(01) 1A2B 8 pt        2018 |
| Comparative Example 3 | (01) 1A2B 5 pt   Print No. 00102<br>(01) 1A2B 6 pt        08:32:11<br>(01) 1A2B 7 pt        05 Dec<br>(01) 1A2B 8 pt        2018 | (01) 1A2B 5 pt   Print No. 05861<br>(01) 1A2B 6 pt        10:32:03<br>(01) 1A2B 7 pt        05 Dec<br>(01) 1A2B 8 pt        2018 | (01) 1A2B 5 pt   Print No. 11948<br>(01) 1A2B 6 pt        12:40:11<br>(01) 1A2B 7 pt        05 Dec<br>(01) 1A2B 8 pt        2018 |
| Ink Composition 2H | (01) 1A2B 5 pt   Print No. 00102<br>(01) 1A2B 6 pt        08:32:11<br>(01) 1A2B 7 pt        05 Dec<br>(01) 1A2B 8 pt        2018 | (01) 1A2B 5 pt   Print No. 05861<br>(01) 1A2B 6 pt        10:32:03<br>(01) 1A2B 7 pt        05 Dec<br>(01) 1A2B 8 pt        2018 | (01) 1A2B 5 pt   Print No. 11948<br>(01) 1A2B 6 pt        12:40:11<br>(01) 1A2B 7 pt        05 Dec<br>(01) 1A2B 8 pt        2018 |

FIG. 4D    FIG. 4E

| | Post 8 hours printing | Post 8 hours printing + 1 hour decap period |
|---|---|---|
| Comparative Example 1 | (01) 1A2B 5 pt   Print No. 22815<br>(01) 1A2B 6 pt   16:26:23<br>(01) 1A2B 7 pt   05 Dec<br>(01) 1A2B 8 pt   2018 | (01) 1A2B 5 pt   Print No. 22819<br>(01) 1A2B 6 pt   16:26:08<br>(01) 1A2B 7 pt   05 Dec<br>(01) 1A2B 8 pt   2018 |
| Comparative Example 2 | (01) 1A2B 5 pt   Print No. 22815<br>(01) 1A2B 6 pt   16:26:23<br>(01) 1A2B 7 pt   05 Dec<br>(01) 1A2B 8 pt   2018 | (01) 1A2B 5 pt   Print No. 22819<br>(01) 1A2B 6 pt   16:26:08<br>(01) 1A2B 7 pt   05 Dec<br>(01) 1A2B 8 pt   2018 |
| Comparative Example 3 | (01) 1A2B 5 pt   Print No. 22815<br>(01) 1A2B 6 pt   16:26:23<br>(01) 1A2B 7 pt   05 Dec<br>(01) 1A2B 8 pt   2018 | (01) 1A2B 5 pt   Print No. 22819<br>(01) 1A2B 6 pt   16:26:08<br>(01) 1A2B 7 pt   05 Dec<br>(01) 1A2B 8 pt   2018 |
| Ink Composition 2H | (01) 1A2B 5 pt   Print No. 22815<br>(01) 1A2B 6 pt   16:26:23<br>(01) 1A2B 7 pt   05 Dec<br>(01) 1A2B 8 pt   2018 | (01) 1A2B 5 pt   Print No. 22819<br>(01) 1A2B 6 pt   16:26:08<br>(01) 1A2B 7 pt   05 Dec<br>(01) 1A2B 8 pt   2018 |

INDUSTRIAL THERMAL INKJET INKS

BACKGROUND

1. Field of the Invention

The invention relates to an inkjet ink for thermal inkjet printing that can be used to print reliably at all common industrial environmental conditions, particularly at refrigerated temperatures.

2. Background of the Invention

Thermal inkjet (TIJ) print heads produce ink droplets from thermal vaporization of the ink solvent. In the jetting process, a resistor is heated rapidly to produce a vapor bubble which subsequently ejects a droplet from the orifice. This process is extremely efficient and reproducible. TIJ print heads for industrial applications are generally capable of generating uniform drops of 50 pL volume or lower at frequencies of up to 36 kHz or greater. Typical commercial TIJ devices are specifically designed to vaporize water or solvents that have physical properties close to those of water (e.g. high boiling point, large heat capacity, low molecular weight).

TIJ printing systems have been available for over 30 years. In general, TIJ inks include aqueous-based and organic solvent-based inks. These inks are mainly intended to be used in printing marks, addresses, date and/or lot codes onto pharmaceutical goods, mail or promotional items, and other packaging. Water-based inks are generally limited to applications where the substrates to be printed on are porous materials, while non-porous substrates such as plastic thin films and foils require solvent-based inks or water solvent hybrid inks to provide good print quality, good adhesion and dry times. However, available solvent-based inks have heretofore not performed well in all environments commonly served by coding and marking equipment. For example, in many packaging operations, such as food packaging, products to be printed can be processed in refrigerated or frozen environments. Other plants may not have climate controlled areas and ambient temperatures in warm seasons can exceed 40° C. with high ambient humidity.

Existing TIJ solvent based inks, however, have not been specifically designed to print reliably enough during uninterrupted production at these environmental extremes. Typical solvent-based inks will exhibit poor print quality over time, particularly in the leading edge of a printed message, or they fail to deliver consistently readable codes after printing continuously for even limited time periods (i.e., for periods of only a few hours or even just a few minutes). The failures usually occur as a result of the nozzle orifices being partially or fully clogged by dried ink residue and can be particularly quick to manifest if the print rate is slow due to low production throughput or slow line speed.

CIJ inkjet systems have traditionally been employed where reliable coding and marking at extreme conditions is required due to this technology's inherent and engineered advantages. For example, most CIJ printers employ an automated flushing mechanism that keeps the printing nozzles relatively clear of accumulated ink. TIJ printing systems, in contrast, have been engineered to be easy-to-use and low cost, and do not have such engineered advantages. It is also not a simple matter to adapt CIJ inks for use instead in TIJ printers, because of the different manner in which TIJ printheads operate. In the TIJ mechanism, for each individual ink firing event, a thermal bubble is generated emanating from a heating resistor element. It is generally understood that nucleation leads to a superheated fluid state and temperatures can be greater than twice the liquid's boiling temperature (i.e., more than 200° C. in the case of water based inks). To ensure basic TIJ functionality, the combination of ink ingredients must remain completely stable and soluble over tens of millions of firing events. Many common materials used in CIJ inks such as thermally unstable dyes or resins, conductive salts, adhesion promotors, and the like can lead to resistor kogation. Kogation is a phenomenon where ink components will irreversibly precipitate onto the metallic resistor surface during operation. Kogation can result in lightening of the printed images and/or premature nozzle failure.

TIJ formulations must be specifically designed to be compatible with direct environmental exposure. For example, the drying rate of solvent based inks normally used in thermal inkjet printing can be far slower in cold environments, leading to increased puddling of ink around the nozzle orifices during repetitive jetting events. At the opposite temperature extremes (e.g., temperature higher than 25° C.), inks usually will dry more rapidly leading to ink deposits around or on the nozzles which can also lead to rapid failure. In either case, solids in the ink will tend to accumulate and dry out in or around the nozzle orifices. Since solids are accumulated proximally to the jet and not encompassed by the jet, these deposits are difficult to redissolve yet readily impact the jet drops' directions. This can be a specifically deleterious at cold conditions where ink viscosity can dramatically increase, the solubilities of most solids generally decrease, and the rates of solid redissolution are reduced. Hence, state of the art solvent-based inks that do not account for these factors will show print quality defects after printing continuously for even relatively short periods. When this happens, any accumulated residue must be manually cleaned from the nozzle plate, which requires regular, repeated stopping of the production line and wasting of valuable production time and labor.

The prior art for industrial inks, while sometimes defining the general need for good reliability, does not provide any specific teaching of how to attain it, especially across the range of industrial environments, including lower temperatures. In some cases, TIJ ink designs employ various methods to improve reliability, however, these methods often have the unintended consequence of reducing the inks' functional performance of the ink. When printing onto plastics in particular, it is challenging to formulate inks that achieve suitable wetting, contrast, dry time and adhesion onto plastic surfaces at lower ambient printing temperatures. For example, inkjet inks that typically employ slower drying solvents or humectants to improve reliability cannot improve sufficient functional performance. Other prior embodiments might employ very low overall solids or, particularly, lower dye solids in their inks to avoid reliability issues. Alternatively, toxic materials such as methanol might be used to improve jetability. In yet other prior embodiments, inks might be optimized for optimal printer restart performance (decap) rather than for optimal continuous printing reliability.

In summary, current thermal inkjet inks on the market do not satisfy the need in the art for printing reliability while providing ink formulations that have desirable performance and safety profiles for printing onto food packaging at a wide range of environments. Therefore, there is a need in the art for improved ink compositions for use in thermal inkjet printing in all temperatures, particularly refrigerated temperatures.

SUMMARY OF THE INVENTION

The present invention provides ink compositions for thermal inkjet printing that can allow better print quality for longer periods of time (for example, 2 hours or longer, 4 hours or longer, 6 hours or longer and 8 hours or longer) particularly at lower ambient temperatures such as about 15° C. or lower, such as about 10° C., 5° C., 0° C., or lower. Specifically, the invention provides a thermal inkjet ink composition comprising, consisting essentially of, or consisting of (a) one or more binder resins that exhibit a hydroxyl number or acid number of at least 100 mg KOH/g; (b) one or more terpene phenolic resins; (c) one or more volatile organic solvents; and (d) one or more dyes. Advantageously, the thermal inkjet ink composition uses an at least one of the one or more binder resins with a molecular weight of below 12,000 Da, or more advantageously a molecular weight of between 1,000 Da and 6,000 Da.

In certain embodiments, the at least one of the one or more binder resins is highly soluble in ethanol to more than 10% by weight. Also, in some embodiments, at least one of the one or more binder resins has a hydroxyl number or acid number of at least 200, or at least 100.

In some embodiments of the invention, the thermal inkjet ink composition contains one or more binder resins selected from the group consisting of a styrene allyl alcohol copolymer, a ketone-aldehyde condensation resin, a polyol derived from ketone-aldehyde condensation resin, a hydroxyl functional acrylic resin, and a polyhydroxystyrene. Preferably, at least one of the one or more binder resins is a polymer of styrene and a hydroxyl containing monomer or a polymer of styrene and a carboxylic acid containing monomer.

In some embodiments, the hydroxyl containing monomer is an allyl alcohol or a vinyl alcohol.

In some embodiments, at least one of the one or more terpene phenolic resins has a hydroxyl number less than 100.

In some embodiments, at least one of the one or more terpene phenolic resins is moderately soluble in pure ethanol and highly soluble in 8:2 ethanol:1-propanol to more than 10% by weight. In some embodiments, at least one of the one or more terpene phenolic resins is slightly soluble in pure ethanol and moderately soluble in 8:2 ethanol:1-propanol at 10% or less by weight.

In certain of the embodiments, where the composition contains at least two terpene phenolic resins, each of the two terpene phenolic resins has a different hydroxyl number. In some embodiments, the one or more volatile organic solvents comprise at least 75% by weight of the ink composition. In some embodiments, the one or more volatile organic solvents comprise a solvent selected from C1-C4 alcohols, C3-C6 ketones, C3-C6 esters, C4-C8 ethers, and mixtures thereof. In further embodiments, the one or more volatile organic solvents comprise C1-C4 alcohols which are greater than 70% by weight of the total solvent balance.

The invention also relates to embodiments including a thermal inkjet ink cartridge with a nozzle, containing the thermal inkjet ink composition as described herein. Advantageously, the inkjet ink composition does not yield permanent nozzle loss (e.g., blockages, partial blockages or visible physical distortions) after a storage period of at least two weeks and preferably at least four weeks in the temperature range of about −15° C. to about 40° C. In certain embodiments, the inkjet ink composition has a decap time of at least 1 hour. In other embodiments, the inkjet ink composition has a dry time after printing of no more than 5 seconds on non-porous surfaces.

In some embodiments, the inkjet ink composition has a dissolved oxygen content lower than 5 ppm. In some embodiments, the inkjet ink composition has a viscosity from about 1.20 cP to about 20 cP at 25° C. and the ink surface tension is from about 21 mN/m to about 28 mN/m at 25° C.

In certain embodiments, the dye of the inkjet ink composition is highly soluble in ≥95% ethanol. In some embodiments, the dye is selected from the group consisting of C.I. Index Solvent Black 29 and Solvent Black 27 colorants.

In embodiments of the invention, the inkjet ink composition does not contain a carcinogen, mutagen, or reproductive toxin above 0.1% by weight of the composition.

The invention further relates to a thermal inkjet ink composition comprising: (a) one or more binder resins, at least one of which is a polyurethane; (b) one or more terpene phenolic resins; (c) one or more volatile organic solvents; and (d) one or more dyes.

The invention also provides, in some embodiments, a method for thermal inkjet printing on a substrate for greater than 8 hours at temperatures below 10° C., comprising: (a) using the thermal inkjet ink composition described herein and an inkjet printer; and (b) printing at a temperature below about 10° C. or below about 5° C. In some embodiments, the method involves printing for greater than 8 hours.

BRIEF DESCRIPTION OF THE FIGURES

FIG. 3 is a set of tables providing results of comparative testing of inventive ink composition 3B and comparative example ink compositions 2 (Videojet WLK660081) and 3 (Videojet WLK660082A). Printing was performed on the indicated surfaces at ambient temperature, including aqueous coat card, varnish card, UV coat card, polyvinyl chloride (PVC) (FIG. 3A), low density polyethylene (LDPE), polyethylene (PE) film, polyester film, bi-oriented polypropylene (BOPP) film, (FIG. 3B), polystyrene card, polypropylene (PP) film, high density polyethylene (HDPE) hard flat, and coated aluminum foil (FIG. 3C).

FIG. 4 is a set of tables showing alphanumeric print quality samples from 5 point to 8 point font sizes with a resolution of 300×300 dpi for the indicated comparative example ink compositions and the inventive ink composition 2H at different time points during a continuous printing reliability test, printed at 5° C. with a print rate of 1 print per second. The times are initial (FIG. 4A), 2 hours (FIG. 4B), 4 hours (FIG. 4C), 8 hours (FIG. 4D), and 8 hours plus a one-hour decap period (FIG. 4E).

DETAILED DESCRIPTION

1. Definitions

Figure 1:
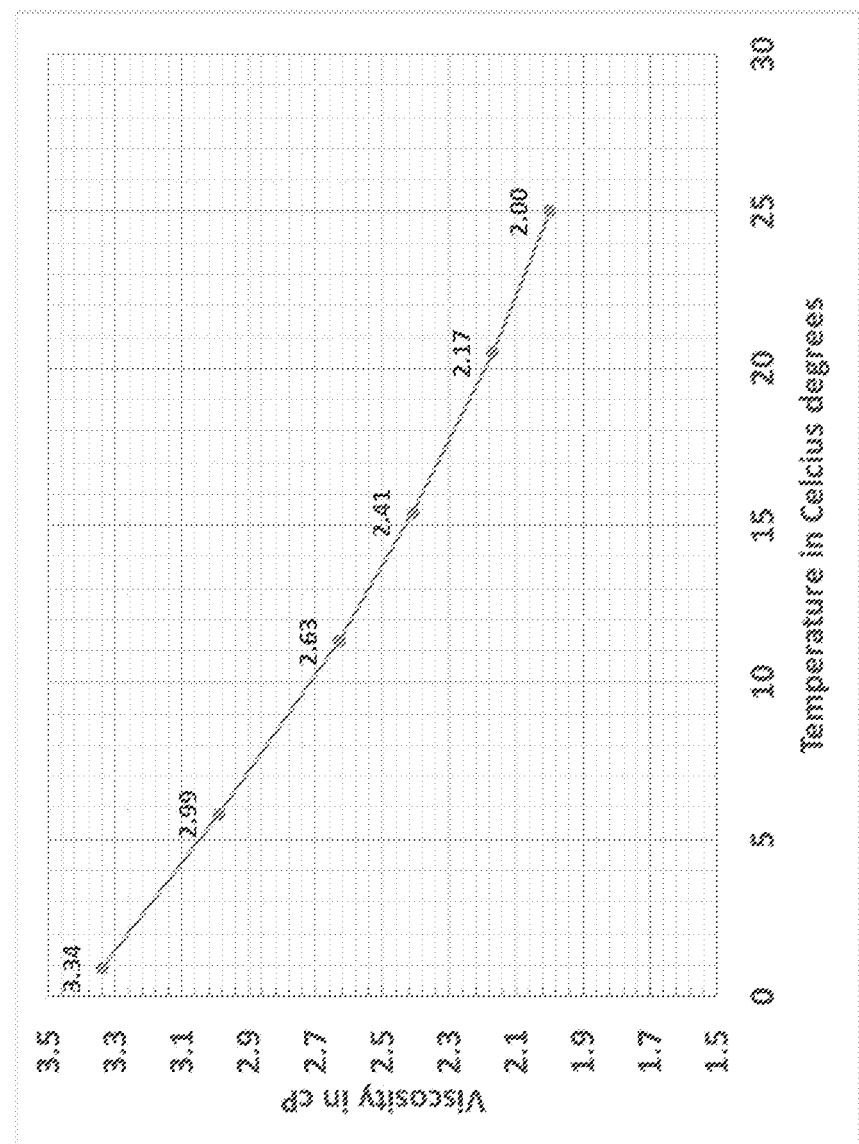
FIG. 1 is a graph showing the viscosity properties of a thermal inkjet ink as a function of ink temperature.

Unless defined otherwise, all technical and scientific terms used herein have the same meaning as commonly understood by one of ordinary skill in the art. Although various methods and materials similar or equivalent to those described herein can be used in the practice or testing of the present invention, suitable methods and materials are described below. However, the skilled artisan understands that the methods and materials used and described are examples and may not be the only ones suitable for use in the invention.

Moreover, it should also be understood that as measurements are subject to inherent variability, any temperature, weight, volume, time interval, pH, salinity, molarity or molality, range, concentration and any other measurements, quantities or numerical expressions given herein are intended to be approximate and not exact or critical figures unless expressly stated to the contrary. Hence, where appropriate to the invention and as understood by those of skill in the art, it is proper to describe the various aspects of the invention using approximate or relative terms and terms of degree commonly employed in patent applications, such as: about, approximately, substantially, essentially, consisting essentially of, comprising, and effective amount. Unless defined otherwise, all technical and scientific terms used herein have the same meaning as commonly understood by one of ordinary skill in the art.

As used herein, the term "about" means plus or minus 20 percent of the recited value, so that, for example, "about 0.125" means 0.125±0.025, and "about 1.0" means 1.0±0.2.

As used herein, the term "hydroxyl number" refers to the number of hydroxyl groups on a molecule, defined as the number of milligrams of potassium hydroxide required to neutralize the acetic acid taken up on acetylation of one gram of the molecule that contains free hydroxyl groups.

As used herein, the term "acid number" refers to the number of acid groups on a molecule, tested by determining the number of milligrams of potassium hydroxide required to neutralize the acidity of one gram of the molecule.

The term "binder resin," or "resin," as used herein, refers to a substance that aids in making the ink composition adhere to the substrate to which it is applied during printing. In general, a binder is a polymeric material that holds other materials together to form a cohesive whole or to impart adhesive properties, particularly onto nonporous or semi-porous substrates.

A "terpene" is a volatile unsaturated hydrocarbon found in essential oils and resins derived from many plants, including citrus and conifers. Terpenes are a complex mixture of various unsaturated cyclic hydrocarbons. "Terpene phenolic resins" generally are synthesized by copolymerization of terpene hydrocarbons and phenol.

As used herein, the term "high solubility" refers to instances when a said material (e.g., a polymeric resin) completely dissolves in the said solvent (e.g., ethanol) or a mixture of solvents to more than 10% by weight between about 20° C. and 25° C.

As used herein, the term "moderate solubility" refers to when a said material (e.g., a polymeric resin) completely dissolves in the said solvent (e.g., ethanol) or a mixture of solvents at greater than 2% but no more than 10% by weight between about 20° C. and about 25° C.

As used herein, the term "slight solubility" refers to when a said material (e.g., a polymeric resin) does not completely dissolve in the said solvent (e.g., ethanol) or a mixture of solvents at greater than 2% by weight of the resin between about 20° C. and about 25° C.

As used herein, the term "decap time" refers to the amount of time that a printer can remain dormant and not printing and then on resuming printing all of the characters in the first code are visible and fully legible. For example, if a decap time is stated to be 30 minutes, then the prints were fully legible at the 30 minute tested time point. Hence the decap time will be at least 30 minutes. The actual decap time may be longer than 30 minutes.

The terms "inkjet" or "ink jet," as used herein, refer to inkjet printing, a type of non-contact printing that creates an image by propelling small droplets of ink onto a substrate such as paper, plastic, metal, glass, and the like. As used herein, the term "thermal inkjet printing (TIJ)" refers to printing where drops of ink are forced from the ink cartridge and onto the printing medium by an air bubble formed due to heat from a resistor, in contrast to "continuous inkjet printing (CIJ)," in which the ink flows continuously through the system and drops are deflected either into a reservoir for reuse or onto the printing medium. Different ink formulations are used for thermal inkjet printing and continuous inkjet printing. A "thermal inkjet ink" is an ink that is suitable for use in a thermal inkjet printer.

As used herein, the term "solvent" refers to a component whose primary function is to dissolve and carry the other components of the ink composition. The term "solvent" also refers to a mixture of solvents. As used herein, the term "volatile" refers to the tendency of a substance to vaporize, related to the vapor pressure of the substance. A volatile solvent is one that has the capability of evaporating or going into a vapor phase. The volatility of a solvent may be based on a relative evaporation rate, usually relative to n-butyl acetate, wherein some solvents are more or less volatile than others. A "volatile organic solvent," therefore, includes any organic solvent that has an evaporation rate of 0.4 or greater where butyl acetate=1.0. Volatile organic solvents preferably also exhibit a surface tension below about 0.028 N/m.

The term "dye," as used herein, refers to a substance that imparts color or modifies the hue of something else, and can refer to any such substance. Colorants include black dyes as well as other colors.

The phrases "substantially free of" or "substantially no," as used herein, in the context of a solvent or other component in the inventive ink composition, refers to a condition in which preferably no appreciable or readily detectable amount of the indicated component is present in the composition. "Substantially no" or "substantially free of" can refer to an amount which is below the detection limit of commonly used detection methods known in the art, or below the maximum amount permitted for the compound by regulation, or an amount below 5%, and preferably below 2%, below 1%, or below 0.5%. Preferably, the amount is below 1%.

2. Overview

Applications such as printing on packaging materials for refrigerated or frozen foods actually require the environmental temperature to be lower than 10° C. Surprisingly, it has been found that several commercially available inks marketed for use as industrial inks when tested at temperatures below 15° C. in continuous printing tests are not able to provide good print quality (e.g., no visible lines or defects develop within the printed image) for up to 8 hours. The ink formulations in the present invention will greatly improve reliability of solvent-based thermal inkjet inks over existing inks particularly in low temperature printing applications.

The present invention provides thermal inkjet inks that provide good reliability at a wide range of industrial print conditions including both low temperature to high temperature environments. The inks according to the invention are particularly advantageous in low-temperature applications, for example, printing at temperatures of 15° C. or lower, about 10° C. or lower, and about 5° C. or lower. The inks are suitable for thermal inkjet printing continuously for 8 hours without developing print defects which can lead to unreadable codes while also maintaining other critical functional aspects including contrast, wetting, decap time, dry time, adhesion, ink cartridge stability, performance, starvation performance, etc.

The ink formulations disclosed as part of the present invention comprise a volatile organic solvent, a colorant and a combination of resins including a terpene phenolic resin and a second binder resin. Suitable binder resins include those that exhibit a hydroxyl number or acid number of at least 100 mg KOH/g and a molecular weight no greater than 12,000 Daltons. The resulting inks yield very reliable TIJ printing especially at low temperatures and provide good decap performance, print quality and adhesion on nonporous substrates.

Without wishing to be bound by theory, it is believed that the best print quality over time is due to a combination of factors with these inks: 1) a minimum degree of pooling or puddling around the orifice on the nozzle plate; 2) a stable ink meniscus that is recessed just within the nozzle between jetting events; and 3) a minimum amount of dried ink deposits around the nozzle orifice over time. These benefits are realized due to the suitable ink formulation and its physical properties. Suitable ink formulation also ensures that the nozzle can fire efficiently at all intended production line speeds.

All references, including publications, patent applications, and patents, cited herein are hereby incorporated by reference in their entirety herein. Nothing herein is to be construed as an admission that the invention is not entitled to antedate such disclosure by virtue of prior invention.

3. Embodiments of the Invention

Binder Resins

Thermal inkjet ink compositions according to the invention include one or more binder resins that allow reliable printing under a variety of temperature and humidity conditions. At least one of the binder resins exhibits a hydroxyl number or acid number of at least 100. Preferably, the one or more resins are compatible with the solvent. For example, the resins used should exhibit in the solvent high solubility (>10%) and relatively fast dissolution rates. Preferred binder resins are selected from the classes of styrene allyl alcohol copolymers; ketone-aldehyde condensation resins or polyols derived therefrom; and hydroxyl functional acrylic resins. Suitable binder resins also include polyhydroxystyrene and copolymers of styrene and a hydroxyl or acid containing monomer, wherein the hydroxyl containing monomer is a vinyl alcohol or allyl alcohol. Acid containing monomers can include any potential acid group, but specific classes include those using carboxylic acid, maleic anhydride, etc.

Specific preferred examples of styrene allyl alcohol (SAA) copolymer resins useful in the invention are SAA-100 and SAA-101, available from LyondellBasell™; examples of ketone-aldehyde condensation resins and derivative polyol resins useful in the invention are TEGO® VariPlus™ CA and TEGO® VariPlus™ SK, available from Evonik™; examples of hydroxyl functional acrylic resins useful in the invention are BM-667, available from Pioneer Chemicals™, Joncryl™ 500, available from BASF™, and TB-179, available from Dianal America™; one example of a polyhydroxystyrene useful for the invention is PHS-B, available from Hydrite™ Chemical Company; one example of carboxylic acid containing resin useful for the invention is Joncryl™ 682, available from BASF™.

It also is believed that resins with a relatively low molecular weight will result in inks with the most rapid redissolution rates and the lowest relative jetting viscosities. Therefore, preferably, the one or more binder resins selected from this group have a molecular weight below 12,000 Daltons. More preferably, the one or more binder resins have a molecular weight between about 1,000 and 6,000 Daltons.

Furthermore, functionalization improves the bulk resin solubility or solid dissolution rate in ethanol. Preferable types of functionalization are carboxylic acid or hydroxyl groups in the polymer. Preferably, the one or more binder resins suitable for the invention have a hydroxyl number or acid number greater than 100 mg KOH/g. More preferably, the one or more binder resins suitable for the invention have a hydroxyl number or acid number greater than 200 mg KOH/g. Resins with this level have shown improved printing performance.

Additional Binder Resins

The ink compositions of the invention also can contain one or more additional binder resins that are compatible with the combined solvents and other resins used in the inks to enhance the overall adhesion or durability of the ink. Particular additional binders must be first selected based on good solubility in the chosen solvents, otherwise they will not print reliably. For example, for ketone and alcohol blends with high alcohol content, the resins should ideally also have high bulk solubility and/or a high cloud point in alcohol. However, as the proportion of ketone is increased, for example, the solvent choice can enable the use of a wider variety of binders as many more binders with a wider range of molecular weights are readily soluble in ketones as opposed to alcohols. In alternate embodiments, the thermal inkjet ink composition includes one or more binder resin selected from the group consisting of cellulose ester resins, polyamide resins, rosin ester resins, acrylic resins, polyesters, phenolic resins, vinyl resins, styrene/acrylate copolymers, cellulose ethers, cellulose nitrate resins, polymaleic anhydrides, acetal polymers, styrene/butadiene copolymers, styrene/methacrylate copolymers, sulfonated polyesters, sulfonamide-modified epoxy resins, sulfonamide-modified formaldehyde resins, sulfonamide-modified melamine formaldehyde resins, aldehyde resins, and any combination thereof, and preferably one or more binder resins selected from the group consisting of cellulose nitrate resins, polyamide resins, rosin ester resins, low functionality acrylic resins, vinyl resins, sulfonamide-modified epoxy resins, sulfonamide-modified formaldehyde resins, sulfonamide-modified melamine formaldehyde resins, and any combination thereof.

Terpene Phenolic Resins

The thermal inkjet ink compositions according to the invention include one or more terpene phenolic resins. Hydrogenated terpene phenolic resins are also suitable. In some embodiments the terpene phenolic resin(s) have an average molecular weight of over 500 Da, 700 Da, 800 Da, 900 Da, or 1000 Da, for example 1100 Da or more, including 1200 Da, 1500 Da or 2000 Da.

Terpene phenolic resins for use with the invention are selected based on their hydroxyl number and their solubility in alcohol solvents. Preferred terpene phenolic resins have a medium hydroxyl number of between about 50 and about 100 mg KOH/g. At room temperature, preferred terpene phenolic resins are only moderately soluble in pure ethanol, but are highly soluble in 8:2 ethanol:1-propanol mixture to more than 10% by weight. More preferably, the thermal inkjet ink composition includes at least two terpene phenolic resins, each with different hydroxyl numbers of between about 50 and about 100 mg KOH/g, and another with a hydroxyl number of <50 mg KOH/g.

Other preferred terpene phenolic resins exhibit hydroxyl numbers of <50 mg KOH/g and a reduced alcohol solubility. These terpene phenolic resins can be used on their own as the terpene phenolic resins of the composition, but also can be used as part of a mixture of terpene phenolic constituents in the ink. These terpene phenolic resins with lower hydroxyl numbers typically are slightly soluble in 100% ethanol and moderately soluble in 8:2 ethanol:1-propanol mixture to 10% or less by weight.

Specific examples of terpene phenolic resins that are suitable for use in the invention include those from Arakawa Chemical™ (Tamanol™); Kraton™ (Sylvares™); SI Group™ (SP™); and, Yasuhara Chemical™ (YS Polyster™). Examples of low hydroxyl number terpene phenolic resins which can be used with the invention are SP-553, available from SI Group™ Inc., and YS Polyster UH115™, available from Yasuhara Chemical Co., Ltd. Examples of medium hydroxyl number terpene phenolic resins are Tamanol 901™, available from Arakawa Chemical™; Sylvares TP96™ and Sylvares 1115™, available from Kraton™ Corp., and YS Polyster T115™ and YS Polyster T145™, available from Yasuhara Chemical Co., Ltd.

The terpene phenolic resins are present in the ink composition at a concentration of about 0.2% by weight to about 10% by weight, preferably about 0.2% by weight to about 5% by weight, and most preferably about 0.3% by weight to about 3% by weight. When two or more terpene phenolic resins are present, the total amount of terpene phenolic resin is present in the ink composition at a concentration of about 0.5% by weight to about 10% by weight, preferably about 1% by weight to about 5% by weight, and most preferably about 1.5% by weight to about 4% by weight.

Consideration must also be made by the practitioner of terpene phenolic resins' or binder resins' impact on substrate wetting.

Solvents

Suitable organic solvents contemplated for use in the invention include one or more volatile organic solvents selected from C1-C4 alcohols, C3-C6 ketones, C3-C6 esters, C4-C8 ethers, and mixtures thereof, and the like. Examples of suitable C1-C4 alcohols include methanol, ethanol, 1-propanol, 2-propanol, 1-butanol, and 2-butanol. Examples of C3-C6 ketones include acetone, methyl ethyl ketone (MEK), methyl n-propyl ketone (MPK), methyl isopropyl ketone, methyl n-butyl ketone, methyl isobutyl ketone, and cyclohexanone. Examples of C3-C6 esters include methyl acetate, ethyl acetate, n-propyl acetate, isopropyl acetate, and n-butyl acetate. Examples of C4-C8 ethers include diethyl ether, dipropyl ether, dibutyl ether, tetrahydrofuran, propylene glycol methyl ether, and diethylene glycol monoethyl ether.

Preferred primary alcohols and ketones for thermal inkjet applications according to the invention are ethanol, 1-propanol, 2-propanol, 1-butanol, acetone, MEK, MPK, and any combination or mixture of two or more of these primary solvents. Additional solvents can be used in smaller amounts with the primary solvent(s). The solvent or solvent mixture should be selected by the practitioner based on the solubility of the ink components, viscosity of the ink, and other functional performance of the ink including dry time, decap time, and adhesion needed for the printed codes.

Typically, the solvent or solvent mixture is used in an amount of up to about 95% by weight of the ink composition, preferably in an amount of from about 50% by weight to about 95% by weight, and more preferably in an amount of from about 80% by weight to about 95% by weight of the ink composition. In general, it is advantageous to use ink compositions where organic solvents comprise greater than 50% by weight, greater than 60% by weight, greater than 65% by weight, greater than 70% by weight, greater than 75% by weight, greater than 80% by weight, greater than 85% by weight, or greater than 90% by weight of the compositions.

Dyes and Colorants

The thermal inkjet ink compositions according to this invention can include any suitable black dyes as colorants. The thermal inkjet ink composition can include any suitable colorant or colorants, which may be dye or pigment. In some embodiments, one or more dyes are employed as the colorant, wherein the one or more dyes are selected from the group consisting of acid dyes, basic dyes, solvent dyes, disperse dyes, mordant dyes, reactive dyes and any combination thereof. Examples of solvent dyes include naphthol dyes, azo dyes, metal complex dyes, anthraquinone dyes, quinoimine dyes, indigoid dyes, benzoquinone dyes, carbonium dyes, naphthoquinone dyes, naphthalimide dyes, phthalocyanine dyes, nigrosine dyes and perylene dyes.

For example, the thermal inkjet ink composition can include one or more dyes selected from the group consisting of C.I. Solvent Yellow 19, C.I. Solvent Yellow 21, C.I. Solvent Yellow 61, C.I. Solvent Yellow 80, C.I. Solvent Orange 1, C.I. Orange 37, C.I. Orange 40, C.I. Solvent Orange 54, C.I. Solvent Orange 63, C.I. Solvent Red 8, Solvent Red 49, C.I. Solvent Red 81, C.I. Solvent Red 82, C.I. Solvent Red 84, C.I. Solvent Red 100, C.I. Acid Red 92, C.I. Reactive Red 31, Orient Pink 312, C.I. Basic Violet 3, C.I. Basic Violet 4, C.I. Solvent Violet 8, C.I. Solvent Violet 21, C.I. Solvent Blue 2, C.I. Solvent Blue 5, C.I. Solvent Blue 11, C.I. Solvent Blue 25, C.I. Solvent Blue 36, C.I. Solvent Blue 38, C.I. Solvent Blue 55; C.I. Solvent Blue 70, C.I. Solvent Green 3, C.I. Solvent Black 3, C.I. Solvent Black 5, C.I. Solvent Black 7, C.I. Solvent Black 22, C.I. Solvent Black 26, C.I. Solvent Black 27, C.I. Solvent Black 29 (VALIFAST BLACK 3808 or ORASOL BLACK RLI™), C.I. Acid Black 123, C.I. Solvent Black 48 (MORFAST BLACK 101™), C.I. Oil Blue 613, and any combination thereof, and preferably one or more dyes selected from the group consisting of C.I. Solvent Black 29 (ORASOL BLACK RLI™), C.I. Solvent Black 27, C.I. Solvent Black 48, C.I. Solvent Black 3 (Oil Black 860), C.I. Basic Violet 3, C.I. Solvent Blue 38, C.I. Solvent Blue 70, C.I. Oil Blue 613, C.I. Solvent Red 49 (ORIENT PINK™ 312), C.I. Solvent Orange 54 (VALIFAST ORANGE™ 3210), and any combination thereof.

In a preferred embodiment, one or more dyes are employed as the colorant, wherein the one or more dyes are selected from the group consisting of black dyes that are highly ethanol soluble in ≥95% ethanol. Preferred dyes are selected from the class of C.I. Index Solvent Black 29 and/or Solvent Black 27 that are not categorized as a Class 1 or 2 carcinogen, mutagen, or reproductive toxin as defined by the Globally Harmonized System of Classification and Labelling of Chemicals (GHS). Certain black colorants are known to incorporate all or some constituents that align with CAS #'s which raise certain risk phrases under the GHS classification. In the case of colorants at the typical levels employed, a positive categorization for the colorant would result in a positive categorization on the Safety Data Sheet for the entire formula mixture. Preferably, for the inventive ink compositions, however, there is no need for their categorization as a carcinogen, mutagen or reproductive toxin. More preferably, these components, if in the ink, are below a threshold of about 0.1% by weight.

Examples of highly preferred C.I. Index Solvent Black 29 dyes are Valifast Black™ 3808 and Valifast Black™ 3870 available from Orient Chemical Industries; examples of highly preferred C.I. Index Solvent Black 27 dyes are Valifast™ 3830 and Valifast™ 3840L available from Orient Chemical Industries.

In any of the embodiments according to the invention, the colorant or dye can be present in an amount from about 0.5% to about 15%, preferably from about 1.5% to about 12%, and more preferably from about 3% to about 10% by weight of the inkjet ink composition.

Further Optional Additives

Optionally, the ink composition also can include one or more humectants. Humectants or wetting agents can assist in maintaining a wet environment in the vicinity of the inkjet nozzle during the evaporation process, thus extending the decap time. The use of too much humectant, however, can negatively impact dry time, adhesion and result in code bleeding due to over-wetting of the substrate. Preferably, humectants have a boiling point at standard pressure greater than about 120° C., greater than 200° C., or greater than 250° C. The ink composition preferably includes less than 25% by weight, preferably less than 15% by weight, and more preferably 5% by weight humectant. In certain embodiments, the ink composition contains about 5% by weight, less than 3% by weight, less than 2% by weight, or is substantially free of any humectant.

The humectants which are useful typically are solvents having one or more polar functional groups such as hydroxyl, ether, amide, ester, ketone, and carbonate, for example, two functional groups, which may be the same or different, such as two hydroxyl groups or one hydroxyl group and one ether group. In an embodiment, the one or more humectants, if present, are selected from the group consisting of polyols, glycol ethers, glycol ether acetate, diacetone alcohol, 2-pyrrolidinone, N-methylpyrrolidinone, ethyl lactate, butyl lactate, propylene carbonate, 1,3-dimethyl-2-imidazolidindione, and alkyl esters, and any combination thereof.

A preferred humectant, if a humectant is present, is glycol ether, for example, a glycol ether selected from the group consisting of ethylene glycol monomethyl ether, ethylene glycol monoethyl ether, propylene glycol monomethyl ether, tripropylene glycol monomethyl ether, ethylene glycol monobutyl ether, diethylene glycol monomethyl ether, diethylene glycol monoethyl ether, propylene glycol n-propyl ether, propylene glycol t-butyl ether, propylene glycol n-butyl ether, dipropylene glycol methyl ether, dipropylene glycol n-propyl ether, dipropylene glycol t-butyl ether, dipropylene glycol n-butyl ether, tripropylene glycol n-propyl ether, tripropylene glycol t-butyl ether, tripropylene glycol n-butyl ether, ethyl cellosolve, methyl cellosolve, polyethylene glycol monomethyl ether, polypropylene glycol monomethyl ether, methoxytriglycol, ethoxytriglycol, butoxytriglycol, 1-butoxyethoxy-2-propanol, ethylene glycol phenyl ether, propylene glycol phenyl ether, diethylene glycol phenyl ether, polyethylene glycol phenyl ether, and any combination thereof, and preferably, the glycol ether is selected from the group consisting of ethylene glycol monomethyl ether, ethylene glycol monoethyl ether, propylene glycol monomethyl ether, tripropylene glycol monomethyl ether, ethylene glycol monobutyl ether, diethylene glycol monomethyl ether, diethylene glycol monoethyl ether, and any combination thereof.

The thermal inkjet ink composition also can further include one or more additives such as surfactants, which can serve as "wetting agents" to increase or reduce ink spreading and/or enhance ink leveling (improve image homogeneity). Preferably, a polymeric surfactant is employed that is soluble at some active level in the ink solvents. Examples of surfactants include polysiloxanes, modified polysiloxanes, silicone modified polyacrylates, alkyl modified polyoxyalkyleneamines, alkyl modified propoxylated (poly(oxypropylene)) diamines, alkyl ether amines, nonyl phenol ethoxylates, ethoxylated fatty amines, fluorinated organic acid diethanolamine salts, alkoxylated ethylenediamines, alkyl modified polyethylene oxides, alkyl modified polyalkyleneoxides, alkyl phosphate ethoxylate mixtures, polyoxyalkylene derivatives of propylene glycol, hydrophobe modified ethoxylated acetylenic diols, secondary alcohol ethoxylates, tall oil fatty acid ethoxylates, simple alcohol ethoxylates, modified perfluoropolyethers (with polyalkyl, alkyl amide, carboxylic acid, alcohol, alcohol ethoxylate, phosphate, ester, silane or polyol modifications), fluoroalkyl and modified versions (i.e., alkyl/fluoroalkyl), and polyoxyethylated fatty alcohols. A specific example of a suitable polymeric surfactant is Silicone Fluid SF-69, available from General Electric, which is a blend of silanols and cyclic silicones. Specific examples of siloxane polyalkyleneoxide copolymer surfactants include SILWET L-7622™ which is a (Momentive Performance Chemicals, USA) and DC205 from Dow Corning. Examples of fluorosurfactants suitable for thermal inkjet compositions include: Novec™ 4430 and Novec™ 4432 (available from 3M); Zonyl™ FSN, Zonyl™ FSH, Capstone FS-34, Capstone FS-35, Capstone™ FS-3100 and Capstone™ FS-22 (available from DuPont™). Examples of alcohol ethoxylates include Makon DA-4, DA-6 and DA-9 from Stepan™. A specific preferred example of a silicone modified polyacrylate is BYK-3550 from BYK Chemie GmbH.

In any of the embodiments, the surfactants can be present in an amount from about 0.01 to about 2.0%, preferably from about 0.02 to about 1%, and more preferably from about 0.03 to about 0.5% of the inkjet ink composition.

The inks also can optionally include one or more plasticizers. Examples of suitable plasticizers are ones that exhibit no volatility (i.e., very high boiling point such as >250° C. and non-measurable or negligible vapor pressures at standard atmospheric conditions). These include examples from any of the classes: phthalate; long chain or aryl modified esters such as diadipate, benzoate, citrate, myristate, maleate, sebacate, acetate-esters; tri-n-hexyltrimellitate; phosphates; polyurethanes; oils (i.e., soybean oil); and, sulfonamide plasticizers such as Plasticizer 8, available from Monsanto Co., St. Louis, Mo., which is n-ethyl o,p-toluene sulfonamide.

In certain embodiments, the plasticizer can be present in an amount from about 0.1 to about 5.0%, preferably from about 0.2 to about 3.0%, and more preferably from about 0.25 to about 2.0% of the inkjet ink composition.

The inks also can comprise defoamers to eliminate obtrusive foaming (e.g., bubbles) during cartridge filling or to minimize the amount of dissolved gases (e.g., micro/nanobubbles) within the ink. Examples of defoamers include the general classes of fluorocarbon based, silicate based, or silicone oil based defoamers. In some embodiments, defoamers can be one in the same as a surfactant.

In certain embodiments, the defoamers can be present in an amount from about 0 to about 2.0%, preferably from about 0.01 to about 1.0%, and more preferably from about 0.02 to about 0.1% of the inkjet ink composition.

The thermal inkjet ink composition also optionally may include additional ingredients such as adhesion promoters, bactericides, fungicides, algicides, sequestering agents, buffering agents, corrosion inhibitors, antioxidants, light stabilizers, anti-curl agents, thickeners, dispersing agents, conductive salts, and other agents known in the relevant art. In an embodiment, the ink composition is free or substantially free of antioxidants.

Suitable Ink Properties

In general, an inkjet ink composition should meet certain requirements to be useful in inkjet printing operations. These relate to ink rheology, the solubility and compatibility of components prior to drying, the drying rate, and wettability on the substrate. The jet ink composition should provide printed images that adhere well to the substrates, particularly non-porous substrates, which, as is known to those of ordinary skill in the art pose challenges with respect to achieving image adhesion. Further, the ink should be capable of passing through the inkjet nozzle without clogging, and should permit reliable operation over the life of the ink.

Inks of the present invention exhibit properties that allow for good operation in thermal inkjet printers. Such properties include suitable dry time, viscosity, solids content, surface tension and dry ink resolubility rate.

The dry time of the inkjet composition preferably is short to enable maximum flexibility in production. For example, the dry time is preferably 5 seconds or less and more preferably 3 seconds or less when printing images onto plastics at 300×300 dots per inch at a temperature between 5° C. and 40° C. and at a relative humidity between about 20 and about 80%.

The inkjet composition at 25° C. preferably has a viscosity of less than about 5 cPs, preferably between about 0.8 cPs and about 2.5 cPs, more preferably between 1.20 cPs and 2.20 cPs. The viscosity of the ink at 5° C. should also be less than about 3.5 cp or more preferably less than 3.1 cp to ensure that the TIJ firing chambers at low temperatures are properly replenished at firing frequencies of 6000 Hz or higher, or more preferably at 12,000 Hz or higher. A viscosity versus temperature curve for a preferred ink is provided in FIG. 1.

The thermal inkjet ink composition preferably has a surface tension from about 20 to about 50 mN/m, from about 20 to about 40 mN/m, or more preferably from about 21 to about 28 mN/m at 25° C.

The solids content (at 25° C.) of the ink compositions according to the invention preferably are equal to or less than 40% by weight of the composition, more preferably less than 30% by weight of the composition, and most preferably less than 20% by weight of the composition.

The thermal inkjet ink composition can be prepared by any suitable method. For example, the chosen ingredients can be combined and mixed with adequate stirring and the resulting fluid filtered to remove any undissolved impurities.

In an embodiment the ink may be used as made or further treated to remove or change content of relatively amounts of any dissolved gases. For example, the ink may be degassed by subjecting it to a vacuum where the concentration of all dissolved gases is decreased. It may be alternatively or further subject to pressurization or sparging of another kind of gas, such as helium gas, to increase the relative ratio of He as compared with gases of higher natural abundance (e.g., $N_2$ and $O_2$).

Cartridges, when not in use, are generally stored with an acceptable storage configuration. A preferred example of such a configuration is the use of a nozzle clip that contains an elastomeric cap which is pressed by action of the clip over the nozzle face and covers the nozzles completely. This cap acts as an effective barrier to solvent or gas transfer. Suitable elastomeric caps can comprise polyurethane and polyvinylchloride based resins but any suitable material can be employed that effectively shield the nozzles. The example of an elastomeric cap provided here is no way intended to be limiting or to be a comprehensive solution, as many different strategies to prevent solvent or gas transfer or to minimize their impact are described in the prior art.

Suitable Printing Systems

Thermal inkjet (TIJ) printheads produce ink droplets from thermal vaporization of the ink solvent. Specifically, in the jetting process, a resistor of a given surface area within the firing chamber is heated rapidly to produce a vapor bubble which subsequently ejects a droplet from the nozzle orifice. This process of micro-Joule heating to generate drops via bubbles is extremely efficient and reproducible given a firing chamber and resistor of consistent dimensions. Typical commercial TIJ devices are specifically designed to vaporize water or solvents that have physical properties close to those of water (e.g. high boiling point, large heat capacity, low molecular weight). Typical TIJ devices for industrial coding can print codes at a low native resolution of 120 or lower dpi to very high native resolutions of 600 dpi or higher and jetting frequency up to about 18 kHz with drop sizes of 50 pL or lower. State of the art TIJ printheads for industrial graphics applications are even capable of generating uniform drops of about 4-20 or lower at resolutions of 1200 dpi or greater at far higher jetting frequencies (e.g., 18 kHz or greater). Suitable applications for the compositions of the invention can range from printing alphanumeric and 2D codes to complex graphic images on target substrates.

The thermal inkjet ink composition can be used in any suitable thermal inkjet cartridge. The thermal inkjet cartridge is preferably fashioned from materials that are resistant to the solvents used in the thermal inkjet ink composition. Generally, as the proportion of aggressive ketone, ester, or ether solvents is increased in the ink cartridge, which is composed primarily of plastics, lithographically formed structures and cured adhesives, may become susceptible to break-down such as solubilizing, melting of components, permeation of fluids through structural barriers, swelling, or delamination of layers, or the like. Suitable thermal inkjet cartridges are available commercially as part of the Videojet™ 8610 Thermal Inkjet Printer from Videojet Technologies™ Inc. and disclosed in U.S. Pat. No. 8,091,993B2, entitled "Ink Containment System and Ink Level Sensing System for an Inkjet Cartridge," and U.S. Pat. No. 8,454,149B2, entitled "Thermal Inkjet Print Head with Solvent Resistance," the contents of both of which are hereby incorporated by reference in their entirety. If a cartridge is not specifically designed to accommodate high levels of aggressive solvents, then the formulation must be adjusted to limit the net total of these solvents.

Any suitable substrate can be printed in accordance with the invention. Examples of suitable substrates include porous substrates such as uncoated paper, semi-porous substrates such as aqueous coated paper, clay coated paper, silica coated paper, UV overcoated paper, polymer overcoated paper, and varnish overcoated paper, and non-porous substrates such as hard plastics, polymer films, metals, glass, polymer coated metallic foils, polymer laminates, foil laminates, and ceramics. The paper substrates can be thin sheets of paper, rolls of paper, labels, or cardboard. Plastics, metals, glass, foils, laminates and ceramic substrates can be in any suitable form such as in the form of bottles, bags, or containers, plates, rods, cylinders, etc.

Plastics employed in packaging are particularly preferred as printing substrates. A variety of flexible plastics are used in food packaging, such as polyester, polyethylene (LDPE and HDPE), but the most common classes are oriented polypropylene-based materials (OPP, BOPP) that typically comprise the outer, printed layer of multilayer barrier films. Besides being common, BOPP represents a difficult class of plastics on which to achieve good durability.

The present disclosure further provides a method for thermal inkjet printing on a substrate in a thermal inkjet printer for extended periods of time at temperatures below 10° C. using the thermal inkjet ink compositions described herein. Printing is accomplished by directing droplets of any of the thermal inkjet ink compositions to a substrate using a thermal inkjet printer and allowing the ink droplets to dry, thereby printing images on a substrate. Typically, customers expect that a when a cartridge is first put into use that it will provide perfect or near perfect print quality with minimal startup maintenance; and that it will require minimal maintenance for the life of the cartridge. Hence, the cartridge after initial production, must survive conditions of transport and storage with suitable packaging without exhibiting permanent nozzle damage. Additionally, a customer using a cartridge in a particular environment (i.e., a refrigerated operation), may choose to store the cartridges in the same environment for several weeks or longer especially after the cartridge is first placed into use. In a typical usage scenario, a customer will remove the protective storage clip and then simply wipe the cartridge nozzle face (i.e., with a dry absorbent wipe or a wipe wetted with an appropriate cleaning solvent) to ensure the nozzles are wetted. After this, the cartridge will be inserted into a printer. Printing can occur in an unpredictable fashion as products are presented to the printer and time gaps between printing events may be highly variable. It is also fairly common for production to occur at a relatively constant linespeed and print rate for relatively fixed durations. After some printing time customers know and expect that the cartridge will require nozzle maintenance to remove any ink/debris buildup and to recover print quality to the original state. This 'expected' period is usually greater than 2 hours, more commonly greater than 4 hours, or even more commonly at least 8 hours (e.g., a typical production shift length). Acceptable maintenance steps to recover temporary blockages due to ink/debris accumulation are usually both fast to implement and effective. It's important to distinguish the difference between these 'expected' maintenance events due to normal operation which are fully recoverable from permanent nozzle loss, where the failure mode is typically irreversible blockage or nozzle defects (i.e., physical changes or distortions to the nozzle) which appear as visible print defects. For the latter case, simply wiping the nozzles or any other easily performed maintenance step will not recover print quality to the original state. After printing is done, a cartridge may be removed and stored with the protective clip in place.

4. Examples

This invention is not limited to the particular processes, compositions, or methodologies described, as these may vary. The terminology used in the description is for the purpose of describing the particular versions or embodiments only, and is not intended to limit the scope of the present invention which will be limited only by the appended claims. Although any methods and materials similar or equivalent to those described herein can be used in the practice or testing of embodiments of the present invention, the preferred methods, devices, and materials are now described. Where appropriate, comparisons were made to inks that are commercially available for sale in the industrial coding and marking arena (e.g., Comparative Examples 1, 2 and 3).

Example 1. Ink Composition Testing

Inks of the inventive compositions shown in Example 2 through Example 6 were made using standard inkjet manufacturing practices. Prior to loading into TIJ cartridges to printer, the ink was degassed by subjecting the ink to suitable vacuum to reduce the dissolved oxygen (DO) content to <5 ppm. For example, by subjecting one liter of ink to a vacuum of 28 in Hg for a period of ten minutes, the DO can be <5 ppm. The DO level was measured with a Hach Orbisphere™ A1100 Oxygen ($O_2$) EC sensor. The inks were filled into HP 45si TIJ print cartridges and printed with a Videojet™ 8510 Thermal Inkjet Printer onto coated paper for low temperature continuous printing and decap testing. A resolution of 300×300 dpi was used in most tests to generate the print samples (unless noted otherwise). The first value (e.g., '300× . . . ') represents the vertical resolution (i.e., the native resolution) which is the actual physical dimensional separation between the nozzles on the nozzle plate being used to generate the printed image. The second value (e.g., ' . . . ×300') represents the resolution in the direction of travel of the substrate underneath the printhead and is controlled by the rate of substrate motion and the selected firing frequency. In some cases 'all nozzles' were checked which indicates that two separate 300×300 patterns each from one of the discrete nozzle banks were generated to check the general condition of the nozzle arrays. For all printing tests using alphanumeric codes the following rating system was used. A 'Pass' rating indicated all the characters in the code were visible to the naked eye and fully legible and a 'Pass−' rating indicates that some (e.g., fewer than five) nozzles were not firing straight but that the text remained legible. A 'Fail' rating indicated that that at least one character in the code was unreadable. In all cases below, whether the rating was 'Pass', 'Pass−' or 'Fail' the code quality could be fully recovered by performing routine maintenance (i.e., wiping the nozzle face with an absorbent cloth). Barcodes were graded with an LVS Integra 9505 Bar Code Quality Station system with INTEGRA 9500/9505 software. In some cases, a grade was reported along with other values (e.g., contrast, $R_{min}$, Modulation, Fixed Pattern Damage) as these are standard parameters provided by barcode grading instruments to indicate to what degree a sample printed barcode conforms to standard values (or, e.g., a direct measure of the likelihood that it will be 'readable'). Ink viscosity where reported was measured using a Brookfield Digital Viscometer (Model DV-I+ or equivalent) equipped with UL Spindle. Surface tension was measured using a Sensodyne Bubble Tensiometer. For all tests involving cartridge storage or cartridge stability, unless otherwise indicated, cartridges were stored with protective caps in place which effectively sealed the nozzles. The latter did not apply to printing reliability tests.

See Tables 1 and 2 for exemplary terpene phenolic resins and binder resins and their characteristics. In general, terpene phenolic resins with low hydroxyl numbers were slightly soluble in pure ethanol and moderate solubility in a mixture of ethanol:1-propanol (8:2); terpene phenolic resins with medium hydroxyl numbers showed moderate solubility in pure ethanol and high solubility in a mixture of ethanol: 1-propanol (8:2); however, terpene phenolic resins with high hydroxyl numbers exhibited high solubility in both pure ethanol and a mixture of ethanol:1-propanol (8:2).

TABLE 1

Exemplary Terpene Phenolic Resins Characteristics.

| Terpene Phenolic Resin | Room Temperature Solubility in Pure Ethanol | Room Temperature Solubility in Ethanol: 1-propanol (8:2) | Average Molecular Weight | Hydroxyl Number (mg KOH/g) | |
|---|---|---|---|---|---|
| YS Polyester U115 | Slight | Moderate | 1100 | 20-30 | Low |
| YS Polyester T115 | Moderate | High | 1200 | 60-70 | Medium |
| YS Polyester G125 | High | High | 1100 | 120-130 | High |
| YS Polyester G150 | High | High | 1200 | 120-130 | High |

TABLE 2

Exemplary Binder Resin Characteristics.

| Resin | Room Temperature Solubility in Pure Ethanol | Weight Average Molecular weight (Mw) | Hydroxyl Number (mg KOH/g) | Acid number (mg KOH/g) |
|---|---|---|---|---|
| SAA 101 | High | <5k | 255 | — |
| SAA 100 | High | <5k | 210 | — |
| Joncryl 682 | High | <5k | — | 238 |
| VariPlus SK | High | <5k | 160 | — |
| Joncryl 500 | High | <5k | 140 | — |
| TB-179 | Moderate | >12k | 135 | — |
| BM-667 | High | ~5k | 128 | — |
| VariPlus CA | High | <5k | 110 | — |
| PHS-B | High | <5k | N/A | — |
| S-LEC B BL-10 | High | >30k | N/A | — |
| K-plast 1022 | High | ~7k | — | — |

A (--) line shown in Table 2 is intended to indicate that the value is low or not significant. An N/A designation is intended to show that the value is significant but that an exact value was not readily available for the material. For example, PHS-B and S-LEC B BL-10 both have significant hydroxyl content, but are not conventionally characterized by their hydroxyl numbers.

In these examples, YS Polyster U115, T115, G125, and G150 were obtained from Yasuhara Chemical Co., LLC. KPLAST 1022 was obtained from Kane International, Inc., and an equivalent material can be obtained under the tradename Reze-lastic 2133 from US Polymers-Accurez Corporation. As for other materials to be introduced in the Examples below, their sources are provided here. SDA3C which is isopropanol denatured alcohol is available from Ashland Chemical Company. 1-propanol was obtained from Dow Chemical Corporation. MPK used was the UHP (e.g., ultra high purity) grade and was obtained from Eastman Chemical Corporation. 1-butanol was obtained from Amoco, Inc. Acetone was obtained from SASOL Chemicals, Inc. DL Black N36B is a solvent black 29 dye and was obtained from Hubei DingLong Chemical Co, Ltd.

Example 2. Performance of Inkjet Ink Compositions

Table 3, below, provides the components of selected ink compositions, and testing results that were indicative of good reliability, functionality and stability. Units in the Tables are percentage by weight, unless otherwise specified. A decap test was performed at room temperature at 300×300 dpi, wherein a 'Pass' rating indicated all the characters in the first printed code after the decap period were visible and fully legible after one hour of decap time. A 'Fail' indicated that not all characters in the first printed code were fully readable, though the print quality was fully recoverable.

A continuous printing test was performed in an environmental chamber with a controlled temperature of between 5° C. and 40° C. Alphanumeric codes of different font sizes ranging from 5 pt to 8 pt with a resolution of 300×300 dpi were printed at a constant print rate of one code per second onto the coated paper. The duration of each of the tests was eight hours, and the Pass/Fail rating was determined by the print quality of the code sampled at the two hour point and the end of the test. The inks were further printed onto a nonporous polyester film substrate for rub fastness adhesion assessments, wherein a 'Pass' on rub fastness rating indicated the code was fully legible after ten rubs using a dry thumb with at least 2 kgs of applied pressure.

Finally a cartridge stability test was performed on selected samples, a 'Pass' rating indicated that all nozzles jetted freely with no unrecoverable print defects after at least 4 weeks of storage at room temperature.

TABLE 3

Inkjet Compositions and Testing Results.

| Ink Composition | 2A | 2B | 2C | 2D | 2E | 2F | 2G | 2H |
|---|---|---|---|---|---|---|---|---|
| Ethanol SDA 3C 200 proof | 60.30 | 79.30 | 70.45 | 56.30 | 49.50 | 53.95 | 57.95 | 70.25 |
| 1-propanol | 26.00 | 10.00 | 7.50 | 25.00 | 20.00 | 25.00 | 20.00 | 7.50 |
| Acetone | — | — | — | — | 15.00 | — | — | — |
| Methyl n-propyl ketone (MPK) | — | — | 7.50 | 5.00 | — | 7.50 | 7.50 | 7.50 |
| Polyester YS U115 | — | — | — | 3.00 | 3.20 | 2.50 | 1.50 | 0.20 |

TABLE 3-continued

Inkjet Compositions and Testing Results.

| Ink Composition | 2A | 2B | 2C | 2D | 2E | 2F | 2G | 2H |
|---|---|---|---|---|---|---|---|---|
| Polyster YS T115 | — | 3.00 | 3.00 | — | — | — | 1.50 | 3.00 |
| Polyster YS G125 | 3.80 | — | — | — | — | — | — | — |
| Polyster YS G150 | 1.80 | — | — | — | — | — | — | — |
| KPLAST 1022 | 1.30 | — | — | 3.00 | — | 2.00 | — | — |
| SAA-100 | — | — | 2.50 | — | 3.60 | 2.00 | 2.50 | 2.50 |
| DL Black N36B | 6.50 | 7.50 | — | 7.50 | 6.50 | — | — | — |
| Valifast Black 3870 | — | — | 7.50 | — | — | 7.50 | 7.50 | 7.50 |
| SF69 | 0.30 | 0.20 | 0.05 | 0.05 | 0.20 | 0.05 | 0.05 | 0.05 |
| BYK 3550 | — | — | 1.50 | 0.15 | — | 1.50 | 1.50 | 1.50 |
| Total | 100.00 | 100.00 | 100.00 | 100.00 | 100.00 | 100.00 | 100.00 | 100.00 |
| Total solids % | 13.34 | 10.70 | 13.80 | 12.79 | 14.94 | 12.80 | 13.80 | 14.00 |
| Resin:dye | 1.01 | 0.40 | 0.73 | 0.69 | 1.27 | 0.60 | 0.73 | 0.76 |
| Decap, RT, 1 hour | Fail | Fail | Fail | Pass | Pass | Pass | Pass | Pass |
| Continuous printing at 5° C., 2 hours | N/T | Fail | Pass | Pass- | Pass | Pass | Pass | Pass |
| Continuous printing at 5° C., 8 hours | N/T | Fail | Pass | Fail | Pass | Pass- | Pass | Pass |
| Rubfastness, Polyester | N/T | Fail | Pass | Pass | Pass | Fail | Pass | Pass |
| Cartridge stability, 4+ weeks | N/T | N/T | N/T | Pass | Fail | N/T | N/T | Pass |

N/T = examples not tested for this aspect.

The ink formulations shown in Table 3 comprise terpene phenolic resins with high, medium, and low hydroxyl numbers and at least one other ethanol soluble binder resin. In the absence of a low hydroxyl number terpene phenolic resin, the ink compositions generally did not perform well in decap (ink examples 2A, 2B and 2C).

Ink compositions (ink examples 2D, 2E, and 2F) comprising a low hydroxyl number terpene phenolic resin and at least one other ethanol soluble binder resin showed good decap performance but required high ketone content in the ink composition to perform well in a continuous printing test at 5° C. While some amount of ketone content in the ink composition could improve continuous printing performance at 5° C., it was found that too much ketone content had a negative impact on the cartridge storage stability (ink example 2E).

It was found, surprisingly, that combining low and medium hydroxyl number terpene phenolic resins together in the same ink composition (ink examples 2G and 2H) yielded a good balance of both decap and low temperature continuous printing performance. From these data, it was concluded that some amount of ketone between about 5 and 15% was beneficial to provide improved cold printing performance while not deleteriously impacting cartridge storage stability. Furthermore, a combination of low and medium hydroxyl number terpene phenolic resins in the same ink composition was beneficial to offer a good balance of decap and low temperature continuous printing performance. A co-resin added such that the combined resin:dye ratio was at least about 0.6, such as polyurethane or styrene allyl alcohol improved adhesion and did not negatively impact low temperature continuous printing performance.

Example 3. Performance of Inkjet Ink Compositions

Table 4, below, provides the components of selected ink compositions, and testing results. Units in Table 4 are percentage by weight, unless otherwise specified. These ink formulations were prepared using a preferred solvent balance, a constant ratio of low and medium hydroxyl number terpene phenolic resins, but by using chemically different highly ethanol soluble binder resins. Unless otherwise stated, all test reported herein used the same testing methods described in previous examples.

A dry time test was performed where 2D codes with a resolution of 300×300 dpi were printed at room temperature onto nonporous substrates e.g., BOPP and polyester. The dry time was then determined by performing a finger rub across the printed code at increasing time intervals until there was no smearing visibly in any portion of the tested code, wherein a 'Pass' rating indicated a dry time of 5 seconds or less.

For the 'starvation test', the ink cartridges were stored in a 5° C. environment to allow the cartridge and ink contents to equilibrate. The test was performed by printing up to a 12×12 mm Data Matrix code at varying line speeds up to 200 feet per minute and at 300×300 dpi. Readability of the barcode was then scanned for a barcode rating. A 'Fail' rating indicated that barcode readability rating was negatively impacted.

TABLE 4

Inkjet Compositions and Testing Results.

| Ink Composition | 3A | 3B | 3C | 3D | 3E | 3F | 3G | 3H | 3I | 3J | 3K | 3L |
|---|---|---|---|---|---|---|---|---|---|---|---|---|
| Ethanol SDA 3C 200 proof | 70.05 | 72.81 | 54.06 | 70.05 | 69.92 | 70.05 | 70.05 | 70.55 | 70.05 | 70.05 | 71.55 | 70.40 |
| 1-propanol | 7.50 | 7.50 | 15.00 | 7.50 | 7.50 | 7.50 | 7.50 | 7.50 | 7.50 | 7.50 | 7.50 | 7.50 |
| 1-butanol | | | 12.00 | | | | | | | | | |
| Methyl n-propyl ketone (MPK) | 7.50 | 7.50 | 7.50 | 7.50 | 7.50 | 7.50 | 7.50 | 7.50 | 7.50 | 7.50 | 7.50 | 6.90 |

TABLE 4-continued

Inkjet Compositions and Testing Results.

| Ink Composition | 3A | 3B | 3C | 3D | 3E | 3F | 3G | 3H | 3I | 3J | 3K | 3L |
|---|---|---|---|---|---|---|---|---|---|---|---|---|
| Polyster YS U115 | 0.40 | 0.32 | 0.32 | 0.40 | 0.40 | 0.40 | 0.40 | 0.40 | 0.40 | 0.40 | 0.40 | 0.40 |
| Polyster YS T115 | 3.00 | 1.80 | 1.80 | 3.00 | 3.00 | 3.00 | 3.00 | 3.00 | 3.00 | 3.00 | 3.00 | 3.00 |
| SAA-100 | 2.50 | 1.60 | 1.60 | | | | | | | | | |
| VariPlus SK | | | | 2.50 | | | | | | | | |
| Hydroxyl functional acrylic 1 (Joncryl 500, 95%) | | | | | 2.63 | | | | | | | |
| Hydroxyl functional acrylic 2 (BM667) | | | | | | 2.50 | | | | | | |
| VariPlus CA | | | | | | | 2.50 | | | | | |
| High acid value acrylic (Joncryl 682) | | | | | | | | 2.00 | | | | |
| Hydroxyl functional acrylic 3 (TB-179) | | | | | | | | | 2.50 | | | |
| PHS-B | | | | | | | | | | 2.50 | | |
| PVB SLEC B BL-10 | | | | | | | | | | | 1.00 | |
| KPLAST 1022 | | | | | | | | | | | | 2.75 |
| DL Black N36B | | | | | | | | | | | | 7.50 |
| Valifast Black 3870 | 7.50 | 7.30 | 7.30 | 7.50 | 7.50 | 7.50 | 7.50 | 7.50 | 7.50 | 7.50 | 7.50 | |
| SF69 | 0.05 | 0.07 | 0.12 | 0.05 | 0.05 | 0.05 | 0.05 | 0.05 | 0.05 | 0.05 | 0.05 | 0.05 |
| BYK 3550 | 1.50 | 1.10 | 0.30 | 1.50 | 1.50 | 1.50 | 1.50 | 1.50 | 1.50 | 1.50 | 1.50 | 1.50 |
| Total | 100.00 | 100.00 | 100.00 | 100.00 | 100.00 | 100.00 | 100.00 | 100.00 | 100.00 | 100.00 | 100.00 | 100.00 |
| Total solids % | 14.20 | 11.64 | 11.29 | 14.20 | 14.33 | 14.20 | 14.20 | 13.70 | 14.20 | 14.20 | 12.70 | 13.68 |
| Viscosity, Cp | 2.14 | 1.76 | 1.85 | 1.89 | 1.98 | 2.05 | 1.88 | 1.92 | 2.14 | 1.98 | 2.32 | 2.12 |
| Decap, RT, 1 hour | Pass | Pass | Pass | Pass | Pass | Pass | Fail | Pass | Pass | Pass | Fail | Pass |
| Continuous printing at 5° C., 2 hours | Pass | Pass | Pass | Pass | Pass | Pass | Pass | Pass | Pass | Pass- | Pass | Pass |
| Continuous printing at 5° C., 8 hours | Pass | Pass | Pass | Pass | Pass | Pass | Pass | Pass | Fail | Fail | Fail | Pass |
| Rubfastness, Polyester | Pass | Pass | Pass | Pass | Pass | Pass | Fail | Pass | Pass | Pass | Pass | Pass |
| Dry time | Pass | Pass | Pass | Pass | Pass | Pass | Pass | Pass | Pass | Pass | Pass | Pass |
| Starvation test | Fail | Pass | Pass | Fail | N/T | N/T | N/T | Fail | N/T | N/T | N/T | N/T |

N/T = these examples were not tested for this aspect.

Inks comprising highly ethanol soluble binder resins with a hydroxyl number greater than 100 mg KOH/g and a low molecular weight binder resin (ink examples 3A to 3H) generally showed good performance in an 8-hour continuous printing test at 5° C. Ink composition 3J containing a resin with different hydroxyl structure was able to print continuously for 2 hours at 5° C.

However, binder resins with a molecular weight higher than about 12,000 (ink examples 3I and 3K), though exhibiting both good solubility and favourable structure, were found to adversely affect low temperature printing performance.

Ink compositions comprising polyurethane co-resin (3L) also showed overall good performance and passed an 8-hour continuous printing test at 5° C.

Figure 2:
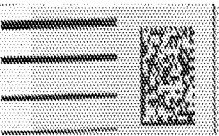
FIG. 2 is a table showing representative printed samples and barcode read results for the indicated inventive and comparative ink compositions at two different printing line speeds at 5° C.
Figure 2:
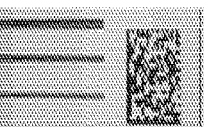
Figure 2:
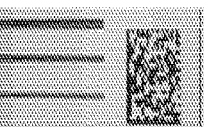
Figure 2:
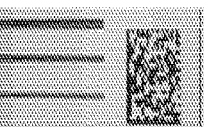
Figure 2:
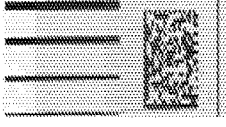
Figure 2:
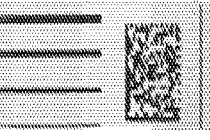

For selected formulations, a starvation test was also performed. Based on the results of the tests it was apparent that barcode readability was more consistent for the reduced viscosity inks 3B and 3C over other higher viscosity inks. Exemplary printed images for inks 3A and 3B versus Comparative Example 2 which (e.g., which exhibited a viscosity >2.25 cp) are provided in FIG. 2.

Example ink 3B which showed good overall performance was also used to print onto a variety of semi-porous and non-porous materials. FIG. 3A, FIG. 3B, and FIG. 3C show the barcode readability of this ink versus Comparative Example 3 and Comparative Example 2. Due to the fact that the codes achieved good substrate wetting across a range of substrate materials, demonstrated barcode readability is very good as compared with current industrial benchmarks.

Example 4. Comparative Inline Print Quality of Inventive Inks

Table 5, below, presents data comparing inventive ink composition 2H and three Comparative TIJ inks in an 8-hour continuous printing test at 5° C. Ink 2H was measured to exhibit a Viscosity of 2.14 cP and a surface tension of 22.3 mN/m. All four ink cartridges were stored at 5° C. for two weeks prior to testing to ensure that they would be stable in the intended printing environment. As before, testing involved continuously printing alphanumeric images (e.g., 5 pt to 8 pt with a resolution of 300×300 dpi) at one code per second and sampling images at successive time points up to 8 hours. A decap test was then performed after the 8 hour printing period without cleaning the nozzle plate.

TABLE 5

Inkjet Comparison Testing Results, Low Temperature.

| | 5° C., Inline Print Quality | | | | | One Hour |
|---|---|---|---|---|---|---|
| | Initial | 2 Hours | 4 Hours | 6 Hours | 8 Hours | Decap Test |
| Comparative Example 1 (Videojet WLK660080) | Pass | Fail | Fail | Fail | Fail | Fail |
| Comparative Example 2 (Videojet WLK660081) | Pass | Pass | Pass | Fail | Fail | Fail |
| Comparative Example 3 (Videojet WLK660082A) | Pass | Fail | Fail | Fail | Fail | Fail |
| Ink Composition 2H | Pass | Pass | Pass | Pass | Pass | Pass |

Codes from the comparative reliability tests at 5° C. are also presented in FIG. 4. Based on the data, all cartridges were able to print at 5° C. with good initial print quality, but the print quality for two of the Comparative inks started to deteriorate within 2 hours. The best Comparative ink was able to print with good print quality for 4 hours and failed between 4-6 hours. In comparison, ink composition 2H was able to print without print quality loss for the entire duration of the 8-hour test and passed a 1-hour decap time test at 5° C.

In a separate test, Ink composition 3A was stored at frozen conditions (−15° C.) for 3 weeks. The ink was subject to the same inline printing test as above and the results are provided in Table 6, below.

TABLE 6

Inkjet Testing Results After Very Low Temperature Storage.

| | 5° C., Inline Print Quality | | | | One Hour Decap |
|---|---|---|---|---|---|
| | Initial | 2 h | 4 h | 6 h | 8 h | Test |
| Ink Composition 3A | Pass | N/T | N/T | N/T | Pass | Pass |

N/T = these examples were not tested for this aspect.

In summary, it was clear that ink compositions 2H and 3A provide good print quality and reliability in refrigerated environments.

Table 7, below, presents data comparing ink composition 2H and three Comparative TIJ inks in a 15-hour continuous printing test at 40° C. at print rate of one print per second. As above, print samples were taken initially and at the end of the test and an additional decap test was performed at the end of the printing period in the same environment. All four ink cartridges were stored at 40° C. for two weeks prior to testing.

TABLE 7

Inkjet Comparison Testing Results, High Temperature.

| | 40° C., inline print quality | | |
|---|---|---|---|
| | Initial | 15 Hours | 1 Hour decap, 40° C. |
| Comparative Example 1 (Videojet WLK660080) | Pass | Fail | Fail |
| Comparative Example 2 (Videojet WLK660081) | Pass | Pass | Pass |
| Comparative Example 3 (Videojet WLK660082A) | Pass | Pass | Pass |
| Ink Composition 2H | Pass | Pass | Pass |

From these data, it was clear that an ink according to ink composition 2H printed reliably after storage at hot conditions compared to commercial benchmarks.

Example 5. Continuous Use Testing of Inventive Inks Versus Comparative TIJ Inks

Table 8, below, presents data for a test comparing ink composition 2H and a comparative TB ink in a regular usage scenario test, where the cartridges are used periodically over the course of four weeks. The printing test was performed by printing a series of 6 pt font alphanumeric codes with a resolution of 300×300 dpi at a constant print rate of one code per second onto the coated paper until a pre-determined number of codes (3000 or 6000) was printed. The cartridges then were stored between printing periods with affixed protective nozzle clips at room temperature for the indicated 'Cumulative storage period.' After the indicated storage period, the printing test was repeated for each cartridge used in this test.

TABLE 8

Inkjet Comparison Testing Results.

| | Cumulative Storage Period | 3000 Codes Printed | 6000 Codes Printed |
|---|---|---|---|
| Comparative Example 3 (Videojet WLK660082A) | initial | Pass | Pass |
| | 1 week | Pass- | Pass- |
| | 2 weeks | Pass- | Pass- |

TABLE 8-continued

Inkjet Comparison Testing Results.

|  | Cumulative Storage Period | 3000 Codes Printed | 6000 Codes Printed |
|---|---|---|---|
|  | 3 weeks | Pass- | Pass- |
|  | 4 weeks | Pass- | Pass- |
| Ink Composition 2H | initial | Pass | Pass |
|  | 1 week | Pass | Pass |
|  | 2 weeks | Pass | Pass |
|  | 3 weeks | Pass | Pass |
|  | 4 weeks | Pass | Pass |

Both ink composition 2H and the Comparative ink were able to print 6000 alphanumeric codes without print quality loss. However, after the cartridges were stored at ambient conditions for one week, some deterioration was observed for codes printed with the Comparative ink (Pass–). Ink composition 2H maintained its print quality in the printing test for the entire duration of the storage period (Pass).

The invention claimed is:

1. A thermal inkjet ink composition comprising:
   a. one or more binder resins that exhibit a hydroxyl number or acid number of at least 100 mg KOH/g and comprises a polymer of styrene and a hydroxyl containing monomer, wherein the hydroxyl containing monomer comprises an allylic alcohol or a vinyl alcohol and at least one of the one or more binder resins has a molecular weight of below 12,000 Da;
   b. one or more terpene phenolic resins;
   c. one or more volatile organic solvents; and
   d. one or more dyes.

2. The thermal inkjet ink composition of claim 1, wherein at least one of the one or more binder resins has a molecular weight of between 1,000 Da and 6,000 Da.

3. The thermal inkjet ink composition of claim 1, wherein at least one of the one or more binder resins is highly soluble in ethanol to more than 10% by weight.

4. The thermal inkjet ink composition of claim 1, wherein at least one of the one or more binder resins has a hydroxyl number or acid number of at least 200 mg KOH/g.

5. The thermal inkjet ink composition of claim 1, wherein at least one of the one or more binder resins has a hydroxyl number of at least 100 mg KOH/g.

6. The thermal inkjet ink composition of claim 5, wherein at least one of the one or more binder resins is a styrene allyl alcohol copolymer.

7. The thermal inkjet ink composition of claim 1, wherein at least one of the one or more binder resins is a poly hydroxy styrene.

8. The thermal inkjet ink composition of claim 1, wherein at least one of the one or more terpene phenolic resins has a hydroxyl number less than 100 mg KOH/g.

9. The thermal inkjet ink composition of claim 1, wherein at least one of the one or more terpene phenolic resins is moderately soluble in pure ethanol and highly soluble in 8:2 ethanol:1-propanol to more than 10% by weight.

10. The thermal inkjet ink composition of claim 1, wherein at least one of the one or more terpene phenolic resins is slightly soluble in pure ethanol and moderately soluble in 8:2 ethanol:1-propanol at 10% or less by weight.

11. The thermal inkjet ink composition of claim 1, comprising at least two terpene phenolic resins, each of which have different hydroxyl numbers.

12. The thermal inkjet ink composition of claim 1, wherein the one or more volatile organic solvents comprise a solvent selected from C1-C4 alcohols, C3-C6 ketones, C3-C6 esters, C4-C8 ethers, and mixtures thereof.

13. The thermal inkjet ink composition of claim 1, wherein the one or more volatile organic solvents comprise C1-C4 alcohols which are greater than 70% by weight of the total solvent balance.

14. The thermal inkjet ink composition of claim 1, wherein the one or more volatile organic solvents comprise at least 75% by weight of the ink composition.

15. The thermal inkjet ink composition of claim 1, wherein the one or more volatile organic solvents comprise greater than 50% by weight of the ink composition.

16. The thermal inkjet ink composition of claim 1, wherein the one or more volatile organic solvents comprise greater than 65% by weight of the ink composition.

17. The thermal inkjet ink composition of claim 16, wherein the one or more volatile organic solvents comprise 80% by weight of the ink composition.

18. A thermal inkjet ink cartridge with a nozzle, containing the thermal inkjet ink composition of claim 1.

19. The thermal inkjet ink cartridge of claim 18, wherein the inkjet ink composition does not yield permanent nozzle loss after a storage period of at least four weeks at a temperature between about −15° C. and about 40° C.

20. The inkjet ink composition of claim 1, which has a decap time of at least 1 hour.

21. The inkjet ink composition of claim 1, which has a dry time after printing of no more than 5 seconds on non-porous surfaces.

22. The inkjet ink composition of claim 1, wherein the dissolved oxygen content of the ink is lower than 5 ppm.

23. The inkjet ink composition of claim 1, wherein the ink viscosity is from about 1.2 cP to about 20 cP at 25° C. and the ink surface tension is from about 21 mN/m to about 28 mN/m at 25° C.

24. The thermal inkjet ink composition of claim 1, wherein the dye is highly soluble in ≥95% ethanol.

25. The inkjet ink composition of claim 1, wherein the dye is selected from the group consisting of C.I. Index Solvent Black 29 and Solvent Black 27 colorants.

26. The inkjet ink composition of claim 1, which does not contain a carcinogen, mutagen, or reproductive toxin above 0.1% by weight of the composition.

* * * * *